(12) United States Patent
Lee et al.

(10) Patent No.: US 9,109,111 B2
(45) Date of Patent: Aug. 18, 2015

(54) WHOLLY AROMATIC LIQUID CRYSTALLINE POLYESTER RESIN COMPOUND HAVING IMPROVED FLUIDITY

(75) Inventors: Myung Se Lee, Daejeon (KR); Young Hak Shin, Seongnam-si (KR); Dong Sik Kim, Daejeon (KR); Mahn Jong Kim, Daejeon (KR)

(73) Assignee: SHENZHEN WOTE ADVANCED MATERIALS CO., LTD., Shenzhen (CN)

( * ) Notice: Subject to any disclaimer, the term of this patent is extended or adjusted under 35 U.S.C. 154(b) by 0 days.

(21) Appl. No.: 13/884,333

(22) PCT Filed: Nov. 15, 2011

(86) PCT No.: PCT/KR2011/008687
§ 371 (c)(1),
(2), (4) Date: May 9, 2013

(87) PCT Pub. No.: WO2012/067396
PCT Pub. Date: May 24, 2012

(65) Prior Publication Data
US 2013/0231434 A1    Sep. 5, 2013

(30) Foreign Application Priority Data

Nov. 16, 2010  (KR) .................. 10-2010-0113904

(51) Int. Cl.
| | | |
|---|---|---|
| *C09K 19/38* | (2006.01) | |
| *C08K 7/10* | (2006.01) | |
| *C08K 7/14* | (2006.01) | |
| *C08L 67/00* | (2006.01) | |
| *C08L 67/04* | (2006.01) | |
| *C08K 3/34* | (2006.01) | |
| *C08K 3/26* | (2006.01) | |

(52) U.S. Cl.
CPC . *C08L 67/04* (2013.01); *C08K 3/34* (2013.01); *C08K 7/10* (2013.01); *C08K 7/14* (2013.01); *C09K 19/3809* (2013.01); *C08K 2003/265* (2013.01); *C08K 2201/003* (2013.01)

(58) Field of Classification Search
CPC ...... C09K 19/3809; C09K 19/54; C08K 7/14; C08K 7/18; C08L 67/00
USPC .......................... 252/299.01, 299.5; 524/449
See application file for complete search history.

(56) References Cited

U.S. PATENT DOCUMENTS

| | | | |
|---|---|---|---|
| 5,766,507 A | 6/1998 | Nakai | |
| 5,976,406 A | 11/1999 | Nagano et al. | |
| 6,733,691 B2 * | 5/2004 | Nagano et al. | 252/299.67 |
| 6,956,072 B1 * | 10/2005 | Kanaka et al. | 524/115 |
| 2006/0025561 A1 * | 2/2006 | Watanabe et al. | 528/272 |

FOREIGN PATENT DOCUMENTS

| | | |
|---|---|---|
| KR | 1992-0009711 | 10/1992 |
| KR | 10-2002-0077110 | 10/2002 |
| KR | 10-0530430 | 2/2006 |
| KR | 10-2010-0080085 | 7/2010 |
| KR | 10-2010-00111094 | 10/2010 |

OTHER PUBLICATIONS

International Search Report—PCT/KR2011/008687 dated Jun. 27, 2012.
Written Opinion—PCT/KR2011/008687 dated Jun. 27, 2012.

* cited by examiner

*Primary Examiner* — Shean C Wu
(74) *Attorney, Agent, or Firm* — Osha Liang LLP

(57) ABSTRACT

Provided is a wholly aromatic liquid crystalline polyester resin compound. The wholly aromatic liquid crystalline polyester resin compound includes a wholly aromatic liquid crystalline polyester resin having a high melting point and mica having a predetermined size.

4 Claims, No Drawings

WHOLLY AROMATIC LIQUID CRYSTALLINE POLYESTER RESIN COMPOUND HAVING IMPROVED FLUIDITY

TECHNICAL FIELD

The present disclosure relates to a wholly aromatic liquid polyester resin compound, and more particularly, to a wholly aromatic liquid crystalline polyester resin compound including a wholly aromatic liquid crystalline polyester resin having a high melting point and mica having a predetermined size.

BACKGROUND ART

A wholly aromatic liquid crystalline polyester resin has excellent heat resistance, dimensional stability, and high fluidity when melted and thus, is widely used as a material for precision injection molding, particularly in the field of electronic parts. In particular, due to high dimensional stability and high electrical insulating characteristics, the use of wholly aromatic liquid crystalline polyester resin as a connector for electronic devices and a socket for various memory cards is increasing.

The wholly aromatic liquid crystalline polyester resin is a kind of a thermoplastic polymer synthesized by condensation polymerization, and it may be mixed with an inorganic filler such as glass fiber or talc, and then extruded to prepare a resin compound. Also, the resin compound prepared according to the method above may be processed into a product through an injection molding process.

On the other hand, connectors for the electronic devices or sockets for the memory cards, where the resin compound is used, are being developed into thin, and wide or long products. Accordingly, to manufacture the thin and long products, fluidity of the resin compound must be excellent. However, when fluidity of the wholly aromatic crystalline polyester resin is increased during a polymerization process of the resin, which is a primary material for the resin compound, to improve the fluidity of the resin compound, mechanical properties and heat resistance and thermal stability of the resin decrease, thereby a product including the resin may be broken, or deformed during a soldering process.

DETAILED DESCRIPTION OF THE DISCLOSURE

Technical Problem

The present disclosure provides a wholly aromatic liquid crystalline polyester resin compound including a wholly aromatic liquid crystalline polyester resin having a high melting point and mica having a predetermined size.

Technical Solution

According to an aspect of the present invention, there is provided a wholly aromatic liquid crystalline polyester resin compound including 100 parts by weight of a wholly aromatic liquid crystalline polyester resin having a melting point of about 300° C. to about 450° C.; and about 5 parts by weight to about 20 parts by weight of mica having an average particle diameter of about 20 μm to about 50 μm.

The wholly aromatic liquid crystalline polyester resin compound may additionally include an inorganic filler other than the mica.

The inorganic filler may be at least one selected from the group consisting of glass fiber, talc, calcium carbonate, and clay.

An amount of the inorganic filler may be about 5 parts by weight to about 90 parts by weight based on 100 parts by weight of the wholly aromatic liquid crystalline polyester resin.

Advantageous Effects

According to an embodiment of the present disclosure, by including a wholly aromatic liquid crystalline polyester resin having a high melting point and mica having a predetermined size, a wholly aromatic liquid crystalline polyester resin compound having improved fluidity, excellent mechanical properties and heat resistance may be provided.

BEST MODE

Hereinafter, a wholly aromatic liquid crystalline polyester resin compound and a method of preparing the wholly aromatic liquid crystalline polyester resin compound will be described in detail.

According to an embodiment of the present disclosure, a wholly aromatic liquid crystalline polyester resin compound includes 100 parts by weight of a wholly aromatic liquid crystalline polyester resin having a melting point of about 300° C. to about 450° C. and about 5 parts by weight to about 20 parts by weight of mica having an average particle diameter of about 20 μm to about 50 μm.

By including the wholly aromatic liquid crystalline polyester resin having a high melting point and the mica having a predetermined size, fluidity of the wholly aromatic liquid crystalline polyester resin compound may improve. When the melting point of the wholly aromatic liquid crystalline polyester resin is below a temperature of 300° C., the fluidity of the resin compound is too high in a high temperature processing region having a temperature of 330° C. or greater, resulting in difficulties in processing of the resin compound, and when the melting point of the wholly aromatic liquid crystalline polyester resin exceeds 450° C., there are difficulties in having sufficient fluidity of the resin compound in the high temperature processing region, resulting in difficulties in processing of the resin compound.

Because the wholly aromatic liquid crystalline polyester resin has a high melting temperature, heat resistance of the resin compound is also high. The wholly aromatic liquid crystalline polyester resin may be prepared by the processes below:

(a) synthesizing a wholly aromatic liquid crystalline polyester prepolymer by condensation polymerization of at least two types of monomers; and (b) synthesizing the wholly aromatic liquid crystalline polyester resin by a solid state condensation polymerization of the pre-polymer.

A monomer used in process (a) includes at least one compound selected from the group consisting of aromatic diol, aromatic diamine, and aromatic hydroxylamine, and additional aromatic dicarboxylic acid. Also, the monomer may additionally include aromatic hydroxy carboxylic acid and/or aromatic amino carboxylic acid.

As a method of synthesis in process (a), solution condensation polymerization and bulk condensation polymerization may be used. Also, to promote condensation reaction of process (a), an acylated (specifically, acetylated) monomer may be used as a monomer of process (a). For this, a pre-acetylation of the monomer may be additionally included before process (a).

For the solid state condensation polymerization of process (b), an appropriate amount of heat should be supplied to the pre-polymer, and as a method of supplying heat, methods using a hot plate, hot air, high temperature fluid, or the like may be used. To remove byproducts of the solid state condensation polymerization, a removal method such as purging by using inert gas or vacuuming may be used.

Wholly aromatic liquid crystalline polyester resins prepared as described above may include various repeating units in a molecular chain thereof. Examples of these repeating units are:

(1) repeating unit derived from aromatic diol:
—O—Ar—O—;
(2) repeating unit derived from aromatic diamine:
—HN—Ar—NH—;
(3) repeating unit derived from aromatic hydroxylamine:
—HN—Ar—O—;
(4) repeating unit derived from aromatic dicarboxylic acid:
—OC—Ar—CO—;
(5) repeating unit derived from aromatic hydroxyl carboxylic acid:
—O—Ar—O—; and
(6) repeating unit derived from aromatic amino carboxylic acid:
—HN—Ar—CO—.

In the formulae of the repeating units, Ar may be phenylene, biphenylene, naphthalene, or an aromatic compound in which two phenylenes are connected to each other by a carbon or a non-carbon element, or phenylene, biphenylene, naphthalene, or one of the above compounds in which at least one hydrogen atom is substituted with other elements.

The mica does not reduce mechanical properties and heat resistance properties of the wholly aromatic liquid crystalline polyester resin compound, and provides high fluidity to the resin compound such that the resin compound may be used in forming a thin and long connector and a socket for a memory card.

When the average particle diameter of the mica is less than 20 μm, the mica may not disperse well in the resin compound, mechanical properties of the resin compound may decrease as resin decomposes during processing of the resin compound, and fluidity of the resin compound may increase greatly, causing difficulties in injection molding. When the average particle diameter of the mica exceeds 50 μm, fluidity of the wholly aromatic liquid crystalline polyester resin compound may be reduced by interfering with a flow of the resin compound.

When the amount of the mica is less than 5 parts by weight based on 100 parts by weight of the wholly aromatic liquid crystalline polyester resin, the wholly aromatic liquid crystalline polyester resin compound may not have sufficient fluidity, and when the amount exceeds 20 parts by weight, the mechanical properties of the wholly aromatic liquid crystalline polyester resin compound may substantially decrease.

The wholly aromatic liquid crystalline polyester resin compound may additionally include an inorganic filler other than the mica. The inorganic filler may increase mechanical strength and heat resistance properties of the wholly aromatic liquid crystalline polyester resin compound including the inorganic filler.

The inorganic filler may include at least one selected from the group consisting of glass fiber, talc, calcium carbonate, and clay.

An amount of the inorganic filler may be about 5 parts by weight to about 90 parts by weight based on 100 parts by weight of the wholly aromatic liquid crystalline polyester resin. When the amount of the inorganic filler is within the range above, the inorganic filler may provide sufficient mechanical strength to the resin compound without decreasing fluidity of the resin compound.

The wholly aromatic liquid crystalline polyester resin compound is prepared by mixing the wholly aromatic liquid crystalline polyester resin having the melting point of about 300° C. to about 450° C. and the mica having the average particle diameter of about 20 μm to about 50 μm to prepare a resin composition, followed by melt-kneading the resin composition. The resin compound including a wholly aromatic liquid crystalline polyester resin having a high melting point and mica having a predetermined size, as described above, have improved fluidity without decreases in heat resistance and mechanical properties such that the resin composition are suitable for manufacturing a thin and long molded product, such as a connector and a socket for a memory card.

Also, for the melt-kneading, a twin-screw extruder, a batch kneader, a mixing roll, or the like may be used. In particular, when the melt-kneading is performed by using the twin-screw extruder, a barrel temperature of an extruder may be maintained at a temperature of about 330° C. to about 450° C. Here, a barrel of the extruder is a part for melting, kneading, and transporting an extruding material (hence, the resin composition) and is also referred to as a cylinder. A screw is attached inside the barrel such that the extruding material is transported forward as the screw rotates, and simultaneously, the extruding material melts due to heat conducted through a barrel surface. Also, to facilitate the melt-kneading, a lubricant may be used during the melt-kneading.

Hereinafter, one or more embodiments of the present disclosure will be described in more detail with reference to the following examples. However, these examples are not intended to limit the scope of the present disclosure.

EXAMPLES

Example 1

(1) Preparing a Wholly Aromatic Liquid Crystalline Polyester Resin 24.4 kg of para-hydroxy benzoic acid, 10.8 kg of biphenol, 7.3 kg of terephthalic acid, and 2.4 kg of isophthalic acid were added to a temperature-adjustable batch reactor having a capacity of 100 L, and nitrogen gas was supplied thereto to make an inner space of the reactor to be in an inert environment, and 33 kg of acetic anhydride was further added to the reactor. Thereafter, a temperature of the reactor was increased to a temperature 150° C. over 30 minutes and alcohol functional groups of monomers were acetylated at the temperature for 3 hours. Thereafter, the temperature of the reactor was increased up to 330° C. over 6 hours while removing acetic acid produced during acetylation reaction to prepare a wholly aromatic liquid crystalline polyester prepolymer by condensation polymerization of the monomers. Also, when preparing the prepolymer, acetic acid is further produced as a byproduct, and the acetic acid was also continuously removed with the acetic acid produced in the acetylation reaction, in preparing the prepolymer. Thereafter, the prepolymer was collected from the reactor and was cooled and solidified.

Thereafter, the wholly aromatic liquid crystalline polyester prepolymer was pulverized to particles having an average diameter of about 1 mm and 20 kg of pulverized prepolymer was added to a rotary kiln reactor having a capacity of 100 L, nitrogen was continuously supplied to the rotary kiln reactor at a flow rate of 1N m³/hr while increasing a temperature of the reactor to 200° C. which is a weight loss initiating temperature, over 1 hour and the temperature of the reactor was increased to 280° C. over 10 hours and maintained at the same temperature for 3 hours to prepare a wholly aromatic liquid crystalline polyester resin. Thereafter, the reactor was cooled over 1 hour at room temperature and collected the wholly aromatic liquid crystalline polyester resin from the reactor.

A melting point of the wholly aromatic liquid crystalline polyester resin measured by using a differential scanning calorimeter was 320° C.

(2) Preparing Wholly Aromatic Liquid Crystalline Polyester Resin Compound (1)

The wholly aromatic liquid crystalline polyester resin prepared in (1), glass fiber (Sungjin Fiber, MF150W-NT), and mica (Dongyang Materials Industrial Co., Ltd, MICA#400, and an average particle diameter of 45 μm) were mixed at a weight ratio of 60:30:10 and the mixture was melt-kneaded by using a twin-screw extruder (L/D: 40 and diameter: 20 mm). During a melt-kneading, a barrel temperature of an extruder was 350° C. Also, during the melt-kneading, the twin-screw extruder was evacuated to remove byproducts therefrom.

Thereafter, melt-kneaded product was mixed in an automatic mixer (a product of Jeil Industrial Device Co., Ltd.) for 10 minutes and dried at a temperature of 130° C. for two hours by using a hot air dryer (a product of Asung Plant) to prepare a wholly aromatic liquid crystalline polyester resin compound (1).

Example 2

A wholly aromatic liquid crystalline polyester resin compound (2) was prepared in the same manner as in Example 1, except for changing a mixture ratio of the wholly aromatic liquid crystalline polyester resin prepared in (1) of Example 1, glass fiber (Sungjin Fiber, MF150W-NT), and mica (Seokyung CMT Co., Ltd., SM-400, and an average diameter of 20 μm) to 60:25:15, based on a weight thereof.

Comparative Example 1

A wholly aromatic liquid crystalline polyester resin compound (3) was prepared in the same manner as in Example 1, except for changing a mixture ratio of the wholly aromatic liquid crystalline polyester resin prepared in (1) of Example 1, glass fiber (Sungjin Fiber, MF150W-NT), and mica (Dongyang Materials Industrial Co., Ltd, MICA#400, and an average particle diameter of 45 μm) to 60:10:30, based on a weight thereof.

Comparative Example 2

A wholly aromatic liquid crystalline polyester resin compound (4) was prepared in the same manner as in Example 1, except for using talc (Dongyang Materials Industrial Co., Ltd., ETA#400, an average particle diameter of 11 μm) instead of using mica (Dongyang Materials Chemistry, MICA#400, and an average particle diameter of 45 μm).

Comparative Example 3

A wholly aromatic liquid crystalline polyester resin compound (5) was prepared in the same manner as in Example 1, except for using mica (Seokyung CMT Co., Ltd., SM-1000, an average diameter of 7 μm) instead of using mica (Dongyang Materials Industrial Co., Ltd, MICA#400, and an average particle diameter of 45 μm).

Evaluation Example

Properties of the wholly aromatic liquid crystalline polyester resin compounds (1) to (5) prepared in Examples 1, 2 and Comparative Examples 1 to 3, respectively were measured as follows:

(Measuring Melt Viscosity (Fluidity))

By using a device for measuring melt viscosity (Rosand Co., RH2000), viscosity of each wholly aromatic liquid crystalline polyester resin compound was measured by using a capillary tube having a size of 1.0 mm×32 mm under conditions of a temperature of 330° C. and a shear rate of $1/1000$s, and a measured value was referred to as a melt viscosity. The lower melt viscosity is, the higher fluidity is.

(Measuring Flexural Strength and Flexural Modulus)

Flexural strength and flexural modulus of each wholly aromatic liquid crystalline polyester resin compound were measured by using ASTM D790.

(Measuring Heat Resistance (Heat Distortion Temperature))

Heat resistance of each wholly aromatic liquid crystalline polyester resin compound was measured by using ASTM D648. Here, applied pressure was about 18.5 kgf/cm².

TABLE 1

| | Example 1 | Example 2 | Comparative Example 1 | Comparative Example 2 | Comparative Example 3 |
|---|---|---|---|---|---|
| Melt viscosity (Poise) | 1308 | 1270 | 340 | 1710 | 640 |
| Flexural strength (MPa) | 166 | 164 | 150 | 163 | 155 |
| Flexural modulus (Gpa) | 15.5 | 15.2 | 12.0 | 13.6 | 12.3 |
| Heat resistance (° C.) | 285 | 283 | 260 | 286 | 263 |

In Table 1, the wholly aromatic liquid crystalline polyester resin compounds prepared in Examples 1 and 2 have similar flexural strength, flexural modulus and heat resistance but high fluidity compared to those of the wholly aromatic liquid crystalline polyester resin compound prepared in Comparative Example 2. That is, in Comparative Example 2, the fluidity decreased substantially by using talc instead of the mica of Examples 1 and 2. In Comparative Example 1, the amount of the mica was too high compared to the amount of mica in Examples 1 and 2, resulting in a decrease in properties, an excessive increase in fluidity due to thermal decomposition and a decrease in heat resistance. In Comparative Example 3, the average particle diameter of the mica was too small compared to that of Examples 1 and 2, resulting in a decrease in properties and an excessive increase in fluidity caused by heat decomposition and a decrease in heat resistance similar to Comparative Example 1.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

The invention claimed is:

1. A wholly aromatic liquid crystalline polyester resin compound, the compound comprising 100 parts by weight of a wholly aromatic liquid crystalline polyester resin having a melting point of about 300° C. to about 450° C.; and about 5 parts by weight to about 25 parts by weight of mica having an average particle diameter of about 20 µm to about 50 µm, wherein the wholly aromatic liquid crystalline polyester resin compound comprises at least a repeating unit derived from an aromatic diamine, an aromatic hydroxylamine and an aromatic amino carboxylic acid.

2. The wholly aromatic liquid crystalline polyester resin compound of claim 1, wherein the wholly aromatic liquid crystalline polyester resin compound further comprising an inorganic filler other than the mica.

3. The wholly aromatic liquid crystalline polyester resin compound of claim 2, wherein the inorganic filler is at least one selected from the group consisting of glass fiber, talc, calcium carbonate, and clay.

4. The wholly aromatic liquid crystalline polyester resin compound of claim 2, wherein an amount of the inorganic filler is about 5 parts by weight to about 90 parts by weight based on 100 parts by weight of the wholly aromatic liquid crystalline polyester resin.

* * * * *